United States Patent [19]

Weisfield et al.

[11] Patent Number: 5,782,665
[45] Date of Patent: Jul. 21, 1998

[54] FABRICATING ARRAY WITH STORAGE CAPACITOR BETWEEN CELL ELECTRODE AND DARK MATRIX

[75] Inventors: Richard L. Weisfield, Los Altos; Michael G. Hack, Mountain View; Joel Levine, Millbrae, all of Calif.

[73] Assignee: Xerox Corporation, Stamford, Conn.

[21] Appl. No.: 581,088

[22] Filed: Dec. 29, 1995

[51] Int. Cl.$^6$ ................................................ H05B 33/10
[52] U.S. Cl. ........................... 445/24; 445/35; 349/111
[58] Field of Search ............................... 445/24, 35, 46; 349/44, 111

[56] References Cited

U.S. PATENT DOCUMENTS

| | | | |
|---|---|---|---|
| 4,568,149 | 2/1986 | Sugata et al. | 350/334 |
| 4,759,610 | 7/1988 | Yanagisawa | 349/111 |
| 4,867,537 | 9/1989 | Aoki et al. | 349/111 |
| 5,056,894 | 10/1991 | Kuijk et al. | 349/111 |
| 5,162,933 | 11/1992 | Kakuda et al. | 349/111 |
| 5,339,181 | 8/1994 | Kim et al. | 359/59 |
| 5,414,547 | 5/1995 | Matsuo et al. | 359/67 |
| 5,432,625 | 7/1995 | Morin et al. | 359/59 |
| 5,446,562 | 8/1995 | Sato | 359/59 |
| 5,459,596 | 10/1995 | Ueda et al. | 359/59 |
| 5,486,939 | 1/1996 | Fulks | 359/74 |
| 5,491,347 | 2/1996 | Allen et al. | 257/59 |
| 5,499,123 | 3/1996 | Mikoshiba | 359/59 |
| 5,510,916 | 4/1996 | Takahashi | 359/67 |
| 5,517,341 | 5/1996 | Kim et al. | 359/59 |
| 5,517,342 | 5/1996 | Kim et al. | 359/59 |
| 5,557,534 | 9/1996 | Wu | 364/491 |
| 5,600,461 | 2/1997 | Ueda et al. | 349/38 |

FOREIGN PATENT DOCUMENTS

| | | |
|---|---|---|
| 0 136 509 A2 | 4/1985 | European Pat. Off. . |
| 0 554 061 A1 | 8/1993 | European Pat. Off. . |
| 0 556 484 A1 | 8/1993 | European Pat. Off. . |
| 0 569 601 A1 | 11/1993 | European Pat. Off. . |
| 0 592 063 A2 | 4/1994 | European Pat. Off. . |
| 0 604 006 A2 | 6/1994 | European Pat. Off. . |

| | | |
|---|---|---|
| 404280228 A | 10/1992 | Japan . |

OTHER PUBLICATIONS

Matsueda, Y. et al. "HDTV Poly-SI TFT-LCD Light Valve with 70% Aperture Ratio." Conference Proceedings from The 13th International Display Research Conference, Aug. 31–Sep. 3, 1993, Strasbourg, France, pp. 601–605.

U.S. Patent Application No. 08/559,862 entitled "Multiple Gate Polysilicon Structures With Continuously Doped Interchannel Regions", filed on Nov. 20, 1995, Now U.S. Pat. 5,703,382.

U.S. Patent Application No. 08/572,357 entitled Array With Metal Scan Lines Controlling Semiconductor Gate Lines, filed on Dec. 14, 1995, Now U.S. Pat. 5,600,155.

U.S. Patent Application No. 08/367,984 entitled "Circuitry With Gate Line Crossing Semiconductor Line at Two or More Channels", filed on Jan. 3, 1995, Now U.S. Pat. 5,608,557.

U.S. Patent Application No. 08/455,888 entitled "Integrated Dark Matrix For An Active Matrix Liquid Crystal Display And Manufacturing Method", filed on May. 31, 1995, Now U.S. Pat. 5,682,211.

(List continued on next page.)

*Primary Examiner*—Patrick Ryan
*Assistant Examiner*—Jeffrey T. Knapp

[57] ABSTRACT

An array is fabricated in which a cell's dark matrix overlaps its cell electrode so that the overlap areas and the dielectric material between them form a storage capacitor. Each cell's dark matrix can overlap the cell's electrode around its perimeter, and the overlap areas of the dark matrix and the electrode can be sufficiently large and the dielectric layer between them can be sufficiently thin that the storage capacitor they form meets the cell's requirements. The dark matrix can be over the cell electrode, with scan lines and data lines in a series of lower layers, or the dark matrix can be below the series of layers that includes scan lines and data lines, with the cell electrode in an opening defined in the series of layers. The dark matrix layer can be electrically connected to a fixed potential.

37 Claims, 5 Drawing Sheets

OTHER PUBLICATIONS

U.S. Patent Application No. 08/453,732 entitled "Active Matrix Liquid Crystal Device and Manufacturing Method", filed on May 30, 1995, Now U.S. Pat. 5,621,556.

U.S. Patent Application No. 08/577,634 entitled "Fabricating Fully Self–Aligned Amorphous Silicon Device", filed on Dec. 22, 1995, Now U.S. Pat. 5,773,804.

U.S. Patent Application No. 08/578,780 entitled "Array With Amorphous Silicon TFTS in Which Channel Leads Overlap Insulating Region No More Than Maximum Overlap (as amended)", filed on Dec. 22, 1995, Now U.S. Pat. 5,717,223.

Suzuki, K., "High–Aperture TFT Array Structures," *SID 94 Digest*, 1994, pp. 167–170.

Yamanaka, H., Fukunaga, T., Koseki, T., Nagayama, K., and Ueki, T., "Integrated Black Matrix on TFT Arrays," *SID 92 Digest*, May 1992, pp. 789–792.

Kim, S.S., Jang, I.S., Kim, D.G., and Kim, N.D., "A Fault–Tolerant Architecture for Amorphous Silicon TFT Active–Matrix LCDs," *Semi Korea, Flat Panel Display Seminar*, Sep. 1995, pp. 119–125.

Ueda, T., Sugahara, J., Toeda, H., Akiyama, M., Ikeda, M., Suzuki, K., "A High–Aperture–Ratio TFT–LCD with a Shield–Electrode Structure," *SID 93 Digest*, May, 1993, pp. 739–742.

FABRICATING ARRAY WITH STORAGE CAPACITOR BETWEEN CELL ELECTRODE AND DARK MATRIX

BACKGROUND

The present invention relates to fabrication of circuitry on substrates. More specifically, the present invention relates to fabrication of arrays of light active cells.

Matsuo et al., U.S. Pat. No. 5,414,547, describe a liquid crystal display device with black matrices made of molybdenum silicide layers. As shown and described in relation to FIGS. 30 and 31, a black matrix can be formed on a transparent substrate on which an active matrix array is formed, with minimum width. The black matrix can be formed along the boundary region of each pixel region and on the surface of a TFT, over an insulating film that in turn is over a pixel electrode. As explained at col. 2 lines 26–41, since a potential is not applied to the black matrix so that it is in a floating state, its potential changes depending on operational state of the display. The potential changes cause display quality to deteriorate. A short circuit between the black matrix and any of the pixel electrodes, data lines, or gate lines will cause a defect. As shown and described in relation to FIGS. 1–27, the black matrix can instead be a conductive and light shielding layer formed in a pixel's boundary region, insulated from data lines, gate lines, and other pixel electrodes, but electrically connected to the pixel electrode of the pixel it bounds. For holding capacitance, either the pixel electrode or the conductive and light shielding layer has an outer end located adjacent and above a forward gate line to form an overlapping portion.

Suzuki, K., "High-Aperture TFT Array Structures," SID 94 Digest, 1994, pp. 167–170, describes a shield Cs structure in sections 2.1 and 3.2. As described in relation to FIG. 2(b), part of a black matrix (BM) pattern is formed on an array substrate, simultaneously with a gate pattern. The BM pattern has some overlap with a pixel electrode, and is referred to as a shield Cs pattern because it functions as a common electrode of a storage capacitance, Cs. Because it works as an electrostatic shield layer, coupling capacitance between a signal line and the pixel electrode can be reduced. As shown in FIG. 5, the Cs line extends across the center of the pixel between signal lines.

SUMMARY OF THE INVENTION

The invention addresses problems that affect fabrication of arrays of light active cells on substrates.

One complicating factor in fabricating a light active cell is the need for a storage capacitor. In a light transmissive AMLCD, for example, each cell must include a storage capacitor sufficiently large to hold the cell's transparent electrode within any of two or more voltage bands during the interval between successive scan line signals.

Conventional techniques provide storage capacitors in a variety of ways. If a light active cell is not light transmissive, a storage capacitor is conventionally formed that includes part of a cell electrode and part of a storage electrode that can be formed, for example, in the same layer as the array's scan lines. If a light active cell is light transmissive, some conventional techniques form a cell's storage capacitor that includes part of an adjacent cell's scan line and part of another conductive layer.

The invention is based on the recognition that other components of an array may be used to provide a storage capacitor more simply. Specifically, an array of light active cells, such as an active matrix array for a liquid crystal display (LCD), must typically include light blocking material, often referred to as a "dark matrix" or "black matrix," positioned to prevent undesired light reflection or transmission. In a backlit LCD, for example, dark matrix is typically necessary along data lines and scan lines to block light from passing around the edges of each cell's light control electrode, which is typically formed in a layer of indium-tin-oxide (ITO). In addition, dark matrix is also typically necessary over each cell's thin film transistor (TFT). It would be advantageous to use the dark matrix rather than an additional electrode or a layer in which data lines and scan lines are formed to provide a storage capacitor.

The invention is further based on the discovery of a technique that forms a storage capacitor using a cell's dark matrix, simplifying each cell's circuitry without significantly reducing aperture ratio. The technique provides a storage capacitor that includes part of the cell electrode, part of the dark matrix, and part of a dielectric layer between the cell electrode and the dark matrix. This technique can provide sufficient capacitance that the cell does not require an additional storage capacitor electrode, significantly simplifying cell circuitry.

The technique can be implemented in an improved method that patterns the cell electrode and conductive dark matrix so that each has an overlap area in which they overlap. The improved method also deposits a layer of dielectric material between the cell electrode and the dark matrix to a thickness so that the overlap areas and the dielectric material between them form a storage capacitor. The improved method then electrically connects the dark matrix to fixed potential circuitry.

The overlap area can be sufficiently large and the dielectric layer sufficiently thin that the storage capacitor has at least the minimum storage capacitance required by the cell. The overlap area can have a substantially uniform width along the entire perimeter of the cell electrode.

The dielectric layer can be silicon nitride, oxynitride, or the like, deposited to a thickness of 1000–2500 angstroms, for example. The cell electrode can be a transparent conductive material such as indium-tin-oxide (ITO). The dark matrix can include a highly conductive metal sublayer coated with a sublayer of light absorbent material.

The technique can also be implemented in a method that produces cell electrodes over a series of layers that include scan lines and data lines, then produces a dielectric pattern over the cell electrodes, and finally produces a dark matrix pattern over the dielectric pattern. Or the technique can be implemented in a method that produces a dark matrix pattern, then deposits a dielectric layer over the dark matrix pattern, then produces a series of patterned layers that include scan lines and data lines and that define for each cell a cell electrode opening that overlaps the cell's dark matrix, and finally produces each cell's electrode in the cell's opening.

The technique can provide an array of light active cells in which each cell's storage capacitor is formed between its cell electrode and its dark matrix. The technique could be applied, for example, to fabricate a light valve array for an AMLCD.

The technique described above is advantageous because it provides ways to integrate a dark matrix onto an active matrix array to provide a storage capacitor that makes the conventional storage capacitor electrode unnecessary, significantly simplifying the array circuitry. For designs in which the storage capacitor electrode would otherwise be under or over an adjacent scan line, the dark matrix storage capacitor can reduce scan line capacitance, providing several possible advantages including increased addressing speed, narrower scan lines, and greater flexibility in choosing a scan line material.

These advantages may be especially important for a very high resolution AMLCD. As resolution and number of lines in a display increase, the time for addressing each scan line decreases, tightly constraining the types and thicknesses of scan line material that can be used. For example, to address a page-size display with 400 spots per inch (spi) resolution, the addressing time should be less than 5 μsec. If scan line capacitance is 150 pF, as would be expected for conventional designs with storage capacitor electrodes under scan lines, this scanning speed can only be attained with scan line material with a sheet resistance no greater than 0.15 Ω/□, a value below the resistance of currently available hillock-free aluminum lines. If electrodes under scan lines are omitted, however, gate line capacitance decreases to 80 pF. This reduction may allow very high resolution AMLCDs using currently available scan line materials. This reduction may also allow narrower scan lines in very high resolution AMLCDs, further increasing aperture ratio.

The following description, the drawings, and the claims further set forth these and other aspects, objects, features, and advantages of the invention.

DETAILED DESCRIPTION

A. Conceptual Framework

The following conceptual framework is helpful in understanding the broad scope of the invention, and the terms defined below have the indicated meanings throughout this application, including the claims.

"Circuitry" or a "circuit" is any physical arrangement of matter that can respond to a first signal at one location or time by providing a second signal at another location or time, where the second signal includes information from the first signal. Circuitry "stores" a first signal when it receives the first signal at one time and, in response, provides the second signal at another time. Circuitry "transfers" a first signal when it receives the first signal at a first location and, in response, provides the second signal at a second location.

Any two components are "connected" when there is a combination of circuitry that can transfer signals from one of the components to the other. For example, two components are "connected" by any combination of connections between them that permits transfer of signals from one of the components to the other. Two components are "electrically connected" when there is a combination of circuitry that can transfer electric signals from one to the other. Two components could be electrically connected even though they are not in physical contact, such as through a combination of conductive components that are electrically connected between them.

When circuitry transfers a signal from a first component to a second component, the first component "provides" the signal, and the second component "receives" the signal. A "signal interval" is a period of time during which a signal is provided or received.

An "electric circuit" is a circuit within which components are electrically connected. An "electric structure" is a physical structure that includes one or more electric circuits.

A "substrate" or "chip" is a unit of material that has a surface at which circuitry can be formed or mounted. An "insulating substrate" is a substrate through which no electric current can flow.

A "layer" is a thickness of material formed over a surface and extending generally parallel to the surface, with one side toward the surface and another side away from the surface. A layer may include two or more layers within it, referred to as "sublayers." A layer may be homogeneous or its composition may vary.

An operation "deposits" a layer by depositing material to form the layer, such as by physical or chemical vapor deposition.

A "patterned layer" is a layer that forms a pattern. For example, a patterned layer may be formed by removing part of a layer to form a pattern or by depositing a layer in a pattern.

To perform "lithography" or to "lithographically pattern" is to use a radiation source to transfer a mask pattern to a layer of radiation-sensitive material and then to develop the radiation-sensitive material to obtain a positive or negative copy of the mask pattern. If it is to be used for etching, a pattern of resist that results from development may be referred to as a "pattern of mask material" or simply a "mask."

An "integrated circuit" is a circuit formed at a substrate's surface by batch processes such as deposition, lithography, etching, oxidation, diffusion, implantation, annealing, and so forth.

A "thin-film structure" is an electric structure that is formed at a surface of an insulating substrate. A thin-film structure could be formed, for example, by depositing and lithographically patterning films on the insulating substrate's surface.

During production of an electric structure at a surface, a part of a first layer "covers" or "has a shape that covers" or "is over" a part of a second layer if the part of the second layer is between the part of the first layer and the surface.

A "lead" is a part of a component at which the component is electrically connected to other components. A "line" is a simple component that extends between and electrically connects two or more leads. A line is "connected between" the components or leads it electrically connects. A lead of a component is "connected" to a lead of another component when the two leads are electrically connected by a combination of leads and lines. In an integrated circuit, leads of two components may also be "connected" by being formed as a single lead that is part of both components.

The terms "array" and "cell" are related: An "array" is an article of manufacture that includes an arrangement of "cells." For example, a "two-dimensional array" or "2D array" includes an arrangement of cells in two dimensions. A 2D array of circuitry may include rows and columns with a line for each row and a line for each column. Lines in one direction may be "data lines" through which a cell receives or provides signals that determine or indicate its state. Lines in the other direction may be "scan lines" through which a cell receives a signal enabling it to receive signals from or provide signals to its data line. The cell receives signals from or provides signals to a data line "under control of" a scan line if signals from the scan line enable the cell to receive signals from or provide signals to the data line.

In an array with scan lines and data lines, a cell's "addressing time" is the signal interval during which the cell's scan line enables it to receive or provide signals through its data line.

In an array of circuitry, "cell circuitry" is circuitry connected to a cell's scan line and data line.

In an array of circuitry, a cell is a "light active cell" if the cell includes circuitry that can interact with light, such as by sensing light, by emitting light, or by modifying reflected or transmitted light. The cell circuitry of a light active cell is "light active circuitry." The cell's "light active area" is the area within which the cell's light active circuitry can interact with light.

A component "blocks" light by absorbing the light or otherwise preventing the light from being transmitted or reflected.

A "dark matrix material" is a material that can block light.

In an array of light active cells, a patterned layer of dark matrix material "blocks light in an area" if the dark matrix material blocks nearly all light in the area so that light cannot be transmitted or reflected in the area.

A "crossing region" is a region in which two lines cross, such as a scan line and a data line.

An "insulating layer" is a layer formed of a non-conductive material.

A part of a layer "has an edge" if another, complementary part of the layer has been removed by one or more processes, leaving the part of the layer. The edge is the boundary between part of a layer and its complementary part.

A part of a first layer "overlaps" a part of a second layer and vice versa if the part of the first layer is over and extends beyond an edge of the part of the second layer, but has an edge inside the edge of the part of the second layer. Where a first part and a second part overlap, the "overlap area" of the first part is the area of the first part between the first part's overlapping edge and the projection of the overlapping edge of the second part onto the first part. If first and second overlapping parts are separated by a third layer, the part of the third layer that is "between" the overlapping parts is the part between the projection of the first part's overlapping edge onto the third layer and the projection of the second part's overlapping edge onto the third layer.

An operation "forms" an electrical connection by producing an electric structure through which current can flow between components. The operation could, for example, solder a wire between leads of the components.

A component is "at a fixed potential" if, during operation of the circuit, it is connected through a combination of leads and lines to a low impedance component, referred to herein as "fixed potential circuitry," that is treated as being at a fixed potential. For example, an integrated circuit typically has an external ground connection that is treated as zero potential; a component that is connected by a combination of leads and lines to the external ground connection is at a fixed potential and, more specifically, is at ground potential.

A "capacitively coupled signal" is a signal that a component receives capacitively rather than through other events, such as flow of current to or from the component.

A capacitively coupled signal "decays" in a material if the signal rapidly loses energy as it propagates through the material. The rate at which the signal loses energy may be indicated by a "time constant" $\tau$ such that the voltage of the signal as a function of time can be approximated by the equation $v=V_0 e^{-\alpha t}$, where $\alpha=(1/\tau)$.

A signal decays "in significantly less time than" a signal interval or other time period if the rate at which the signal loses energy is indicated by a time constant that is less than half the signal interval or other time period.

A "connected component" is a part of a patterned layer shaped such that any two locations within the part are connected by a line of other locations within the part. Therefore, if a connected component is part of a conductive patterned layer, any two locations within the connected component are electrically connected through the connected component.

A "capacitive element" or "capacitor" is a component that stores a voltage level by storing charge. A capacitive element may include two conductive components, called "electrodes," separated by an insulating layer. A "dielectric layer" is an insulating layer that separates the electrodes of a capacitive element.

In a 2D array of circuitry, a cell's area may include a "cell electrode." A cell electrode may serve as one electrode of a capacitor whose other electrode is external to the array.

Overlapping parts of two conductive layers and a part of a dielectric layer between them "form a storage capacitor" for a cell of an array if the overlapping parts and the part of the dielectric layer between them functions to capacitively store signals that are received or provided by the cell. The overlapping parts may, for example, be a cell electrode and a dark matrix.

An "image" is a pattern of physical light.

An "image output device" is a device that can provide output defining an image.

A "display" is an image output device that provides information in a visible form.

A "liquid crystal cell" is an enclosure containing a liquid crystal material.

A "liquid crystal display" or "LCD" is a display that includes a liquid crystal cell with a light transmission characteristic that can be controlled in parts of the cell by an array of light control units to cause presentation of an image.

An "active matrix liquid crystal display" or "AMLCD" is a liquid crystal display that includes a liquid crystal cell and an array of cell circuitry that can cause presentation of an image by the liquid crystal cell.

B. General Features of the Invention

Figure 1:
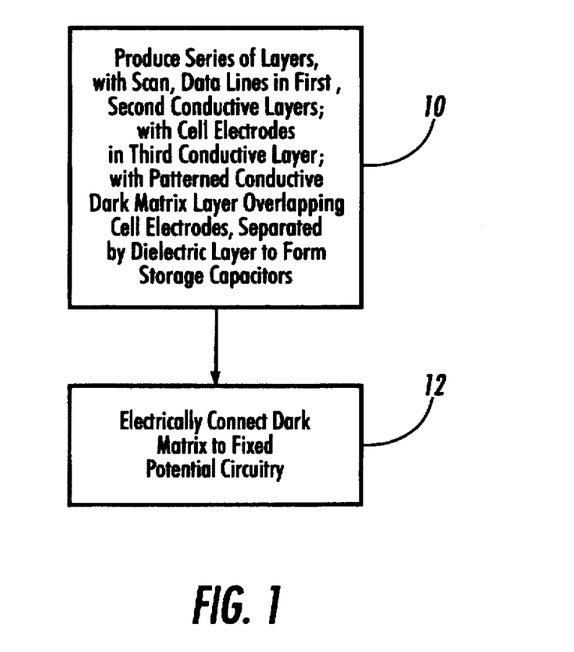
FIG. 1 is a flow chart showing general acts in producing an array in which a cell's fixed potential dark matrix and cell electrode have overlap areas that, together with dielectric material between them, form a storage capacitor.
Figure 2:
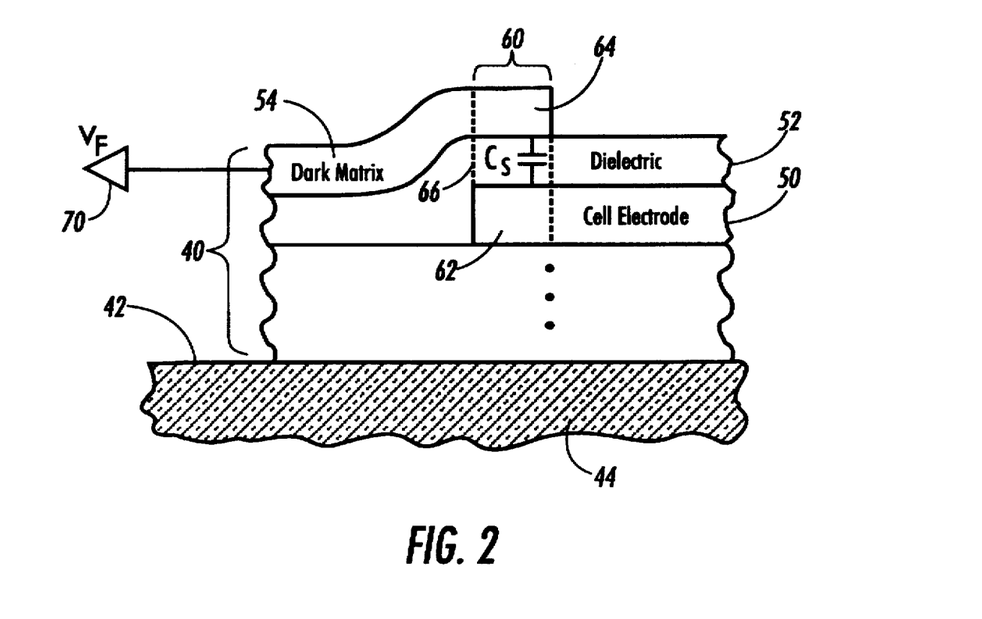
FIG. 2 is schematic cross section showing a storage capacitor formed by the acts in FIG. 1.
Figure 3:
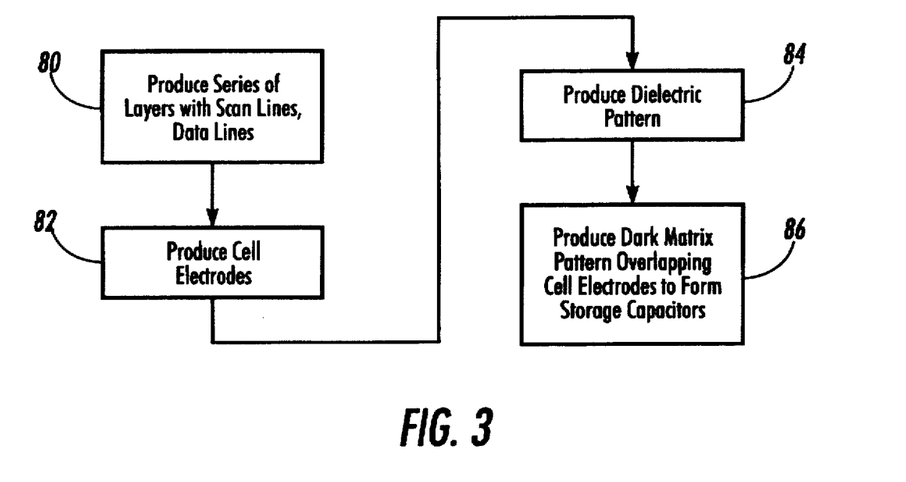
FIG. 3 is a flow chart showing acts that can produce a structure like that in FIG. 2.
Figure 4:
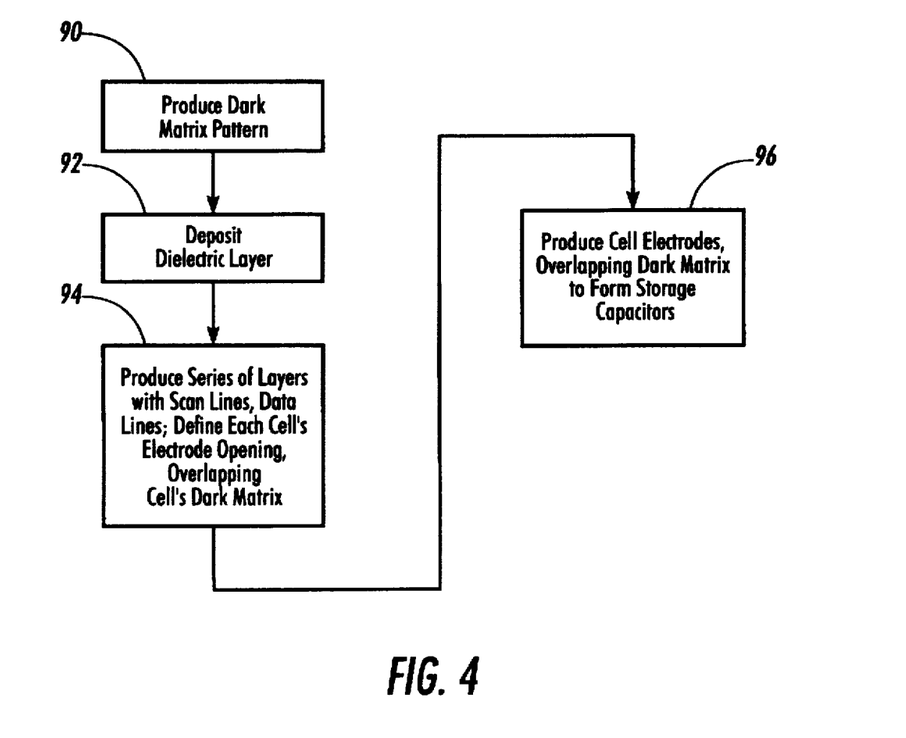
FIG. 4 is another flow chart showing acts that can produce a structure like that in FIG. 2.

FIGS. 1–4 show general features of the invention. FIG. 1 shows general acts in producing an array in which a cell's fixed potential dark matrix and cell electrode have overlap areas that, together with dielectric material between them, form a storage capacitor. FIG. 2 shows a storage capacitor formed by the acts in FIG. 1. FIGS. 3 and 4 show two ways of producing a structure like that in FIG. 2.

The act in box 10 in FIG. 1 produces a series of layers on a surface of a substrate, with each cell including parts of the series of layers. The layers include a first conductive layer with scan lines, a second conductive layer with data lines, a third conductive layer with cell electrodes, a patterned layer of conductive dark matrix material, and a dielectric layer between the cell electrodes and the dark matrix. Each cell's dark matrix and cell electrode overlap, and the overlap areas and the dielectric material between them for a storage capacitor for the cell. The act in box 12 electrically connects the dark matrix to a fixed potential.

Circuitry 40 in FIG. 2 is formed on surface 42 of substrate 44. Circuitry 40 includes cell electrode 50, formed in a layer of conductive material. Cell electrode 50 is illustratively shown over a number of other layers that could, for example, include scan lines, data lines, and a switching element for a cell, such as a TFT. Over cell electrode 50 are dielectric layer 52 and then dark matrix 54, a cell's part of a patterned layer of dark matrix material that is conductive. As shown, dark matrix 54 overlaps cell electrode 50.

Capacitor 60 includes overlap area 62 of cell electrode 50, overlap area 64 of dark matrix 54, and part 66 of dielectric layer 52 between overlap areas 62 and 64. Even though dark matrix 54 is electrically connected to fixed potential circuitry 70 and is therefore held at fixed potential $V_F$, capacitor 60 has capacitance $C_S$, and $C_S$ can provide a cell's required storage capacitance if overlap areas 62 and 64 are large enough and if part 66 of dielectric layer 52 is thin enough. In general, a cell requires a storage capacitance that is at least two or three times as large as the capacitance of the liquid crystal in the area controlled by the cell's electrode.

The order of layers in FIG. 2 is merely illustrative: Cell electrode 50 could instead be over dielectric layer 52 and dark matrix 54, and other layers that include scan lines, data lines, and switching elements could instead be over rather than under the layers that include cell electrode 50, dielectric layer 52, and dark matrix 54.

In FIG. 3, the act in box 80 begins by producing a series of layers that includes scan lines and data lines in first and second conductive layers, respectively, as well as insulating layers and other layers as appropriate for each cell's circuitry. The act in box 82 produces cell electrodes in a patterned layer of conductive material over the series of layers from box 80. The act in box 84 produces a dielectric pattern over the cell electrodes. The act in box 86 produces a conductive dark matrix pattern over the dielectric pattern, overlapping the cell electrodes to form a storage capacitor for each cell.

In FIG. 4, the act in box 90 begins by producing a conductive dark matrix pattern. The act in box 92 deposits a dielectric layer over the dark matrix pattern. The act in box 94 produces a series of layers that includes scan lines and data lines in first and second conductive layers, respectively, as well as insulating layers and other layers as appropriate for each cell's circuitry, much as in box 80 in FIG. 3; for each cell, the act in box 94 defines a cell electrode opening in the series of layers, and the opening overlaps the cell's dark matrix. The act in box 96 produces cell electrodes in a patterned layer of conductive material. Each cell's electrode is in the cell's opening from box 94, so that it overlaps the cell's dark matrix to form a storage capacitor.

C. Implementation

The general features described above could be implemented in numerous ways to fabricate various arrays. The implementation described below is suitable for fabricating AMLCD arrays.

C.1. Capacitor With Dark Matrix

FIGS. 5–8 show an implementation in which a fixed potential dark matrix overlaps with a cell electrode to form a capacitor. The implementation in FIGS. 5–8 can be made using AMLCD technology described in copending, coassigned U.S. Pat. No. 5,621,556, entitled "Active Matrix Liquid Crystal Device and Manufacturing Method" ("the Top ITO Application"), incorporated herein by reference. In the implementation of FIGS. 5–8, each pixel could be square with effective widths of approximately 45 µm×45 µm and scan lines and data lines could be approximately 5 µm wide.

Figure 5:
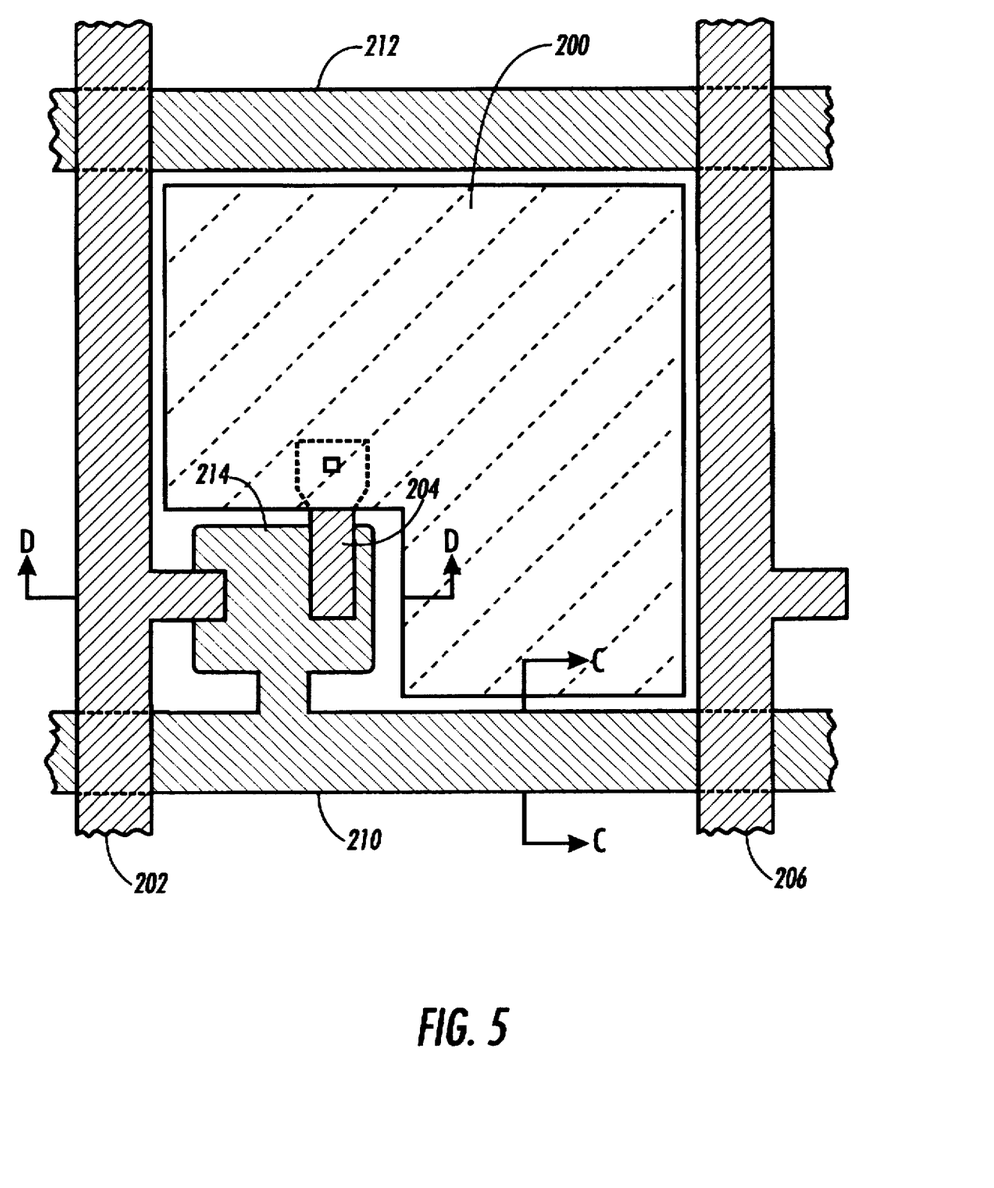
FIG. 5 is a schematic circuit diagram showing another layout of a cell with dark matrix connected to a fixed potential.

FIG. 5 shows layout of a cell with dark matrix connected to a fixed potential.

Figure 6:
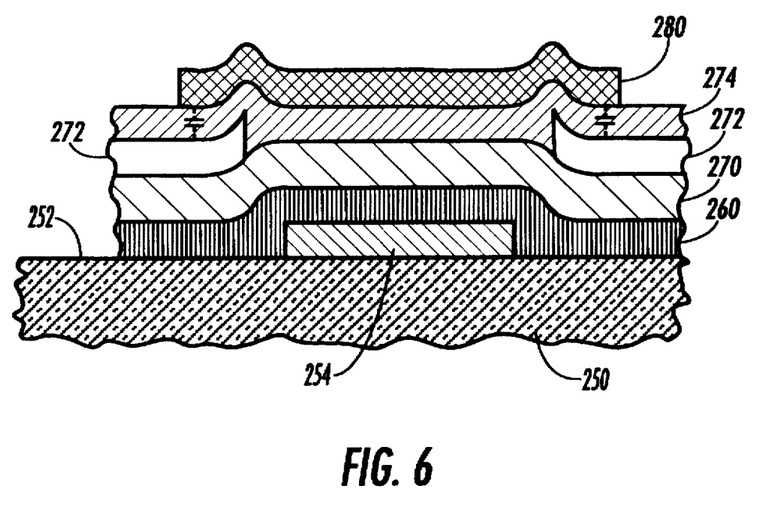
FIG. 6 is a cross sectional view of the cell in FIG. 5, taken along line C—C.
Figure 7:
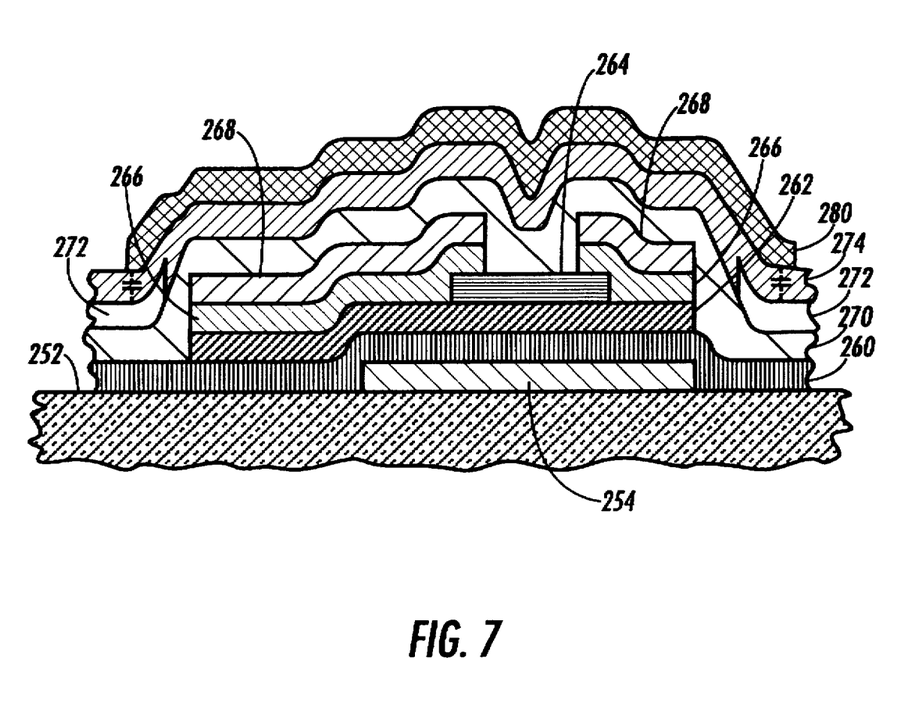
FIG. 7 is a cross sectional view of the cell in FIG. 5, taken along line D—D.
Figure 8:
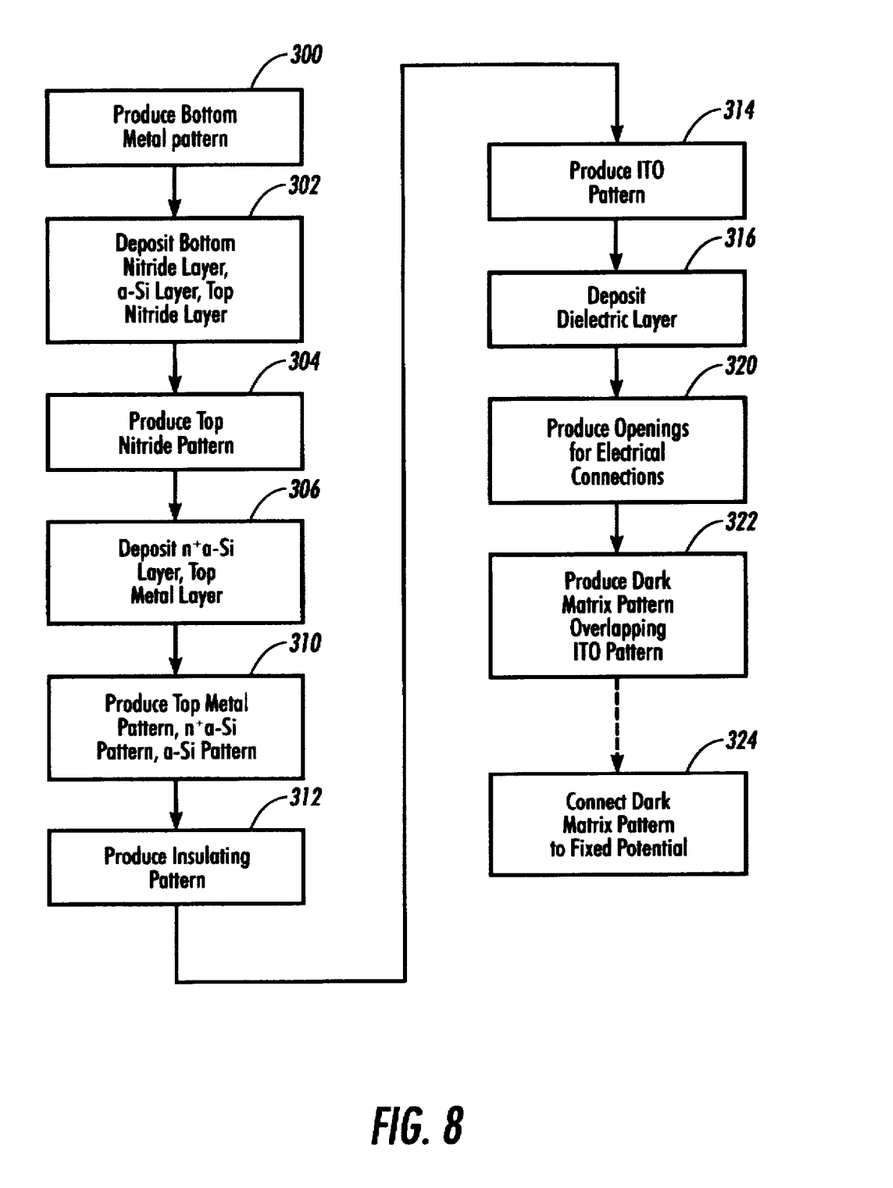
FIG. 8 is a flow chart showing acts in producing a structure as shown in FIGS. 5–7.

FIG. 6 shows a cross-section along line C—C in FIG. 5. FIG. 7 shows a cross-section along line D—D. FIG. 8 shows acts in producing a structure as shown in FIGS. 5–7.

FIG. 5, which is a modified version of FIG. 1 of the Top ITO Application, shows a layout for a light control unit of an AMLCD. FIG. 5 shows three layers, with upper layers that are farthest from the substrate's surface obscuring lower layers.

The uppermost layer shown in FIG. 5 is an ITO layer that forms transparent electrode 200. The next layer shown is a top metal layer, which forms data line 202 connected to one channel lead of an a-Si transistor that switches the light active circuitry. The top metal layer also forms line 204, which connects the other channel lead of the a-Si transistor to transparent electrode 200, and data line 206, bounding the side of the transparent electrode 200 opposite data line 202. The lowest layer shown is a bottom metal layer, which forms scan lines 210 and 212 bounding transparent electrode 200 and also forms lead 214, the gate lead of the transistor, which is connected to scan line 210.

FIG. 5 does not explicitly show the dark matrix layer. Within the light control units of the array, however, the dark matrix layer forms a grid that is complementary to the ITO layer, overlapping the ITO layer by a distance sufficient to provide an adequate storage capacitor, such as 1 or 2 µm. Therefore, the edge of the dark matrix grid in FIG. 5 would be the same as that of transparent electrode 200, but a short distance inward. Because of the capacitor formed by the dark matrix grid and transparent electrode 200, the light control unit does not have an additional capacitor electrode. Because it covers all areas except transparent electrode 200, the dark matrix grid also covers all edges of the data lines and scan lines.

FIGS. 6 and 7 show cross-sections along lines C—C and D—D in FIG. 5, respectively. Layers of the same material are similarly shaded and bear the same reference number in the two drawings.

Substrate 250 has surface 252 at which a thin-film structure is formed, beginning with bottom metal layer 254 which in FIG. 6 forms scan line 210 and in FIG. 7 forms gate lead 214. Over bottom metal layer 254 is bottom nitride layer 260, followed by amorphous silicon layer 262, which in FIG. 7 includes a gated region in which the channel of a TFT can be formed. Over amorphous silicon layer 262 is top nitride layer 264, forming an etch stopping island over the gated region of the amorphous silicon layer in FIG. 7.

Over top nitride layer 264 where it exists and over amorphous silicon layer 262 where it is exposed elsewhere is $n^+$ amorphous silicon layer 266, providing channel leads for the TFT in FIG. 6. Over n+ layer 266 is top metal layer 268, forming data line 202 and line 204 in FIG. 7. Over top metal layer 268 is insulating layer 270, similar to the passivation layer described in the Top ITO Application but not as thick. Over insulating layer 270 is ITO layer 272, forming transparent electrode 200 in both FIGS. 6 and 7, as well as transparent electrodes of adjacent cells.

Over ITO layer 272 and other exposed layers is dielectric layer 274, which could be any appropriate dielectric material, such as silicon nitride, silicon oxide, or silicon oxynitride. Over dielectric layer 274 is dark matrix layer 280. Dark matrix layer 280 could, for example, be a layer of aluminum with a black polyimide on top or on both bottom and top. Or, for easier contact at the periphery of the array, dark matrix layer 280 could be a layer of chromium with chromium oxide on both sides, also referred to as dark chromium. Because the only exposed layers after fabrication are dielectric layer 274 and dark matrix layer 280, a further passivation layer may be unnecessary in the structure of FIGS. 5–7.

As shown in FIGS. 6 and 7, dark matrix layer 280 overlaps ITO layer 272, so that the overlap areas and the part of dielectric layer 274 between them form a storage capacitor for each cell, shown schematically with dashed lines in FIGS. 6 and 7. The overlap areas are sufficiently large and dielectric layer 274 is sufficiently thin that the storage capacitor provides the cell's required storage capacitance.

The act in box 300 in FIG. 8 begins by producing a pattern in bottom metal layer 254 on an insulating substrate such as glass. The act in box 300 can be implemented as described in relation to FIG. 3A of the Top ITO Application, depositing chromium, molybdenum, titanium, copper-aluminum, or aluminum capped with a barrier layer of titanium, titanium-tungsten, tantalum, or any other appropriate metal or alloy. The act in box 300 then lithographically patterns the deposited metal to obtain a pattern that includes scan lines 210 and 212 and gate lead 214.

The act in box 302 then deposits bottom nitride layer 260, amorphous silicon layer 262, and top nitride layer 262. The act in box 302 can be implemented as described in relation to FIG. 3B of the Top ITO Application. Bottom nitride layer 260 can be silicon nitride deposited at approximately 300°–380° C. to a thickness of approximately 3000 angstroms. Amorphous silicon layer 262 can contain approximately 5–12% hydrogen and can be deposited at approximately 230°–300° C. to a thickness of approximately 300–500 angstroms. Top nitride layer 264 can be silicon nitride deposited at approximately 200°–250° C. to a thickness of approximately 1000–1500 angstroms.

The act in box 304 then lithographically patterns top nitride layer 264 to produce an etch stopping island as described above in relation to FIG. 7. Top nitride layer 264 can also be retained in crossover regions where data lines cross scan lines, as described in copending, coassigned U.S. Pat. No. 5,486,939, entitled "Thin-Film Structure With Insulating and Smoothing Layers Between Crossing Conductive Lines," incorporated herein by reference.

The act in box 306 deposits $n^+$ amorphous silicon layer 266 and top metal layer 268. The act in box 306 can be implemented as described in relation to FIG. 3C of the Top ITO Application, with $n^+$ amorphous silicon layer 266 including approximately 0.5–2% phosphorous and approximately 5–15% hydrogen, deposited at approximately 200°–250° C. to a thickness of approximately 1000 angstroms. Top metal layer 268 can include molybdenum-chromium, titanium, tantalum, a multilayered structure with alternating layers of aluminum and titanium-tungsten (TiW), or aluminum with appropriate barrier metal layers on top and bottom, such as titanium, TiW, or tantalum. For example, a first sublayer of TiW can be approximately 500 angstroms thick; then an aluminum sublayer can be approximately 3000–10,000 angstroms thick; then a second sublayer of TiW can be approximately 500–1000 angstroms thick.

The act in box 310 lithographically patterns top metal layer 268, $n^+$ amorphous silicon layer 266, and amorphous silicon layer 262 to produce channel leads for the transistor as well as data lines 202 and 206. As explained in relation to FIG. 3C of the Top ITO Application, a multiple step etch can be used after a patterned layer of photoresist has been lithographically produced, etching the second sublayer of TiW, then the aluminum sublayer, then the first sublayer of TiW, then $n^+$ amorphous silicon layer 266 and amorphous silicon layer 262, both of which will be etched by a 10:1 solution of $CF_4/O_2$. As a result of the act in box 310, $n^+$ amorphous silicon layer 266 and amorphous silicon layer 262 will be retained wherever top metal layer 268 remains, including the crossover regions mentioned above in relation to box 304.

The act in box 312 deposits and lithographically patterns insulating layer 270, which can include silicon oxynitride, silicon nitride, or silicon oxide, or an organic dielectric coating of polyimide or other suitable polymer layer; insulating layer 270 may be similar to the passivation layer described in relation to FIG. 3D of the Top ITO Application. For example, insulating layer 270 could be approximately 5000–50,000 angstroms thick. The act in box 312 patterns insulating layer 270 to produce openings through which ITO layer 272 can form electrical connections with channel leads, as between transparent electrode 200 and line 204 in FIG. 7.

The act in box 314 then deposits and lithographically patterns ITO layer 272. The act in box 314 can be implemented as explained in relation to FIG. 3E of the Top ITO Application. ITO layer 272 forms transparent electrode 200.

The act in box 316 then deposits dielectric layer 274. Dielectric layer 274 could include the same material as insulating layer 270, deposited under the same conditions for etching compatibility to an appropriate thickness for the required storage capacitance, such as approximately 1000–2500 angstroms.

The act in box 320 then lithographically patterns dielectric layer 274, insulating layer 270, and, if necessary, bottom nitride layer 260 to provide openings through which electrical connections can be made. For example, openings can be formed to top metal layer 268 to allow electrical connections between data lines and circuitry that provides data signals. In addition, openings can be formed to bottom metal layer 254 to allow electrical connections between scan lines and circuitry that provides scan signals. And openings can be formed to allow connection of a dark matrix layer to underlying metal layers, through which it can in turn be connected to a fixed potential.

The act in box 322 then deposits and lithographically patterns dark matrix layer 280. The mask used in box 320 can be the complement of that used to pattern ITO layer in box 314, with lines slightly offset to obtain an appropriate overlap for the required storage capacitance, such as approximately 1–2 μm.

The act in box 324 electrically connects the pattern formed in dark matrix layer 280 to circuitry that provides a fixed potential. The electrical connection could be provided through wires or other conductive elements connected to leads in dark matrix layer 280 or in parts of other conductive layers to which it is electrically connected through one or more holes formed by the act in box 320. As suggested by the dashed line between boxes 322 and 324, the act in box 324 may follow other acts that in turn follow box 322, such as acts that make other electrical connections.

After the act in box 324, additional acts can be performed to assemble an AMLCD using the array. Those acts can including spinning on polyimide over dark matrix layer 280, providing further passivation.

C.2. Variations

The implementation described above could be changed in many ways within the scope of the invention.

The implementation described above provides thin film circuitry on an insulating substrate. The invention could be implemented with other types of circuitry on other types of substrates.

The above implementation provides an array of cells with particular dimensions and densities. The invention could be implemented with a wide variety of array sizes and shapes, cell sizes and shapes, and cell densities.

The above implementation provides specific dark matrix layout and materials, but the invention could be implemented with a wide variety of dark matrix layouts and with other materials.

The implementation described above includes layers in a specific sequence, but the sequence of layers could be modified. For example, the above implementation has a dark matrix layer over other layers, but the invention could be implemented with a dark matrix layer under other layers, as described above in relation to FIG. 4.

The implementation described above uses a specific cell layout and circuitry with particular materials and specific geometric and electric characteristics, but the invention could be implemented with many other layouts and types of circuitry with other materials and characteristics. For example, the invention could be implemented with cell layout, circuitry, materials, and characteristics disclosed in copending, coassigned U.S. patent application Ser. No. 08/559,862, entitled "Array Having Multiple Channel Structures With Continuously Doped Interchannel Regions," incorporated herein by reference. Or the invention could be implemented with circuitry, materials, and characteristics disclosed in copending, coassigned U.S. patent application Ser. No. 08/578,780, entitled "Array With Fully Self-Aligned Amorphous Silicon TFTs," incorporated herein by reference.

The implementation described above includes top and bottom nitride layers, but many other materials could be used in insulating layers, such as silicon oxynitride, a composite of silicon nitride and silicon oxynitride, or an anodic oxide such as tantalum oxide or aluminum oxide.

The implementation described above includes layers of specified thicknesses, produced from specified materials by specified processes, but other thicknesses could be produced, and other materials and processes could be used. For example, the dielectric layer could be thinner to increase storage capacitance. Rather than a-Si, other semiconductor materials could be used in the semiconductor layers, including but not limited to poly-Si, microcrystalline silicon, SiGe, CdSe, or a composite layer of poly-Si and SiGe. Similarly, various conductive materials could be used in the scan lines and data lines, including but not limited to any appropriate metal or alloy such as Al with or without layers or barrier metals, ITO, MoTa, Cr, MoCr, Ta, Cu, Ti, TiN, and any appropriate organic conductive material.

The implementation described above fabricates an array with fixed potential dark matrix in accordance with the invention described in copending, coassigned U.S. patent application Ser. No. 08/581,087, entitled "Array With Grounded Dark Matrix," incorporated herein by reference. The invention could, however, be implemented to produce an array in which a dark matrix is not held at fixed potential.

D. Application

The invention could be applied in many ways, including display arrays, light valve arrays, sensor arrays, and other arrays that interact with images.

E. Miscellaneous

The invention has been described in relation to thin-film implementations, but the invention might be implemented with single crystal technology.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method of forming an array of light active cells at a surface of a substrate; the method comprising:

producing a series of layers at the surface of the substrate; the series of layers including:
scan lines; and
data lines;

producing a first patterned layer over the series of layers; the first patterned layer including conductive material; each light active cell including a cell electrode that is part of the first patterned layer;

depositing a layer of dielectric material over the first patterned layer; the layer of dielectric material covering the cell electrode of each light active cell; and producing a second patterned layer over the layer of dielectric material; the second patterned layer including dark matrix material that is conductive; each light active cell including a dark matrix that is part of the second patterned layer; each cell's dark matrix and cell electrode having an overlap area in which they overlap; the overlap area of the cell electrode, the overlap area of the dark matrix, and a part of the layer of dielectric material between them forming a storage capacitor for the cell.

2. An improved method of forming an array of light active cells at a surface of a substrate; each cell including parts of a series of layers over the surface of the substrate; the series of layers including:

a first patterned layer; the first patterned layer including conductive material; the first patterned layer including scan lines;

a second patterned layer; the second patterned layer including conductive material; the second patterned layer including data lines;

a third patterned layer formed over said first and second patterned layers; the third patterned layer including conductive material; each cell including a cell electrode that is part of the third patterned layer;

a fourth patterned layer formed over said third patterned layer; the fourth patterned layer including dark matrix material that is conductive; each cell including a dark matrix that is part of the fourth patterned layer; and a layer of dielectric material between the third and fourth patterned layers;

the improvement comprising;

patterning the third patterned layer and the fourth patterned layer so that the cell electrode and the dark matrix of each cell overlap, the cell electrode and the dark matrix each having an overlap area where they overlap; the overlap area of the cell electrode, the overlap area of the dark matrix, and a part of the layer of dielectric material between them forming a storage capacitor for the cell; and electrically connecting the dark matrix of each cell to fixed potential circuitry to hold the dark matrix at a fixed potential.

3. The improved method of claim 2 in which the improvement further comprises depositing the layer of dielectric material to a thickness between 1000–2500 angstroms.

4. The improved method of claim 2 in which the dielectric material is silicon nitride.

5. The improved method of claim 2 in which the dielectric material is oxynitride or an oxide of silicon.

6. The improved method of claim 2 in which the fourth patterned layer forms a single connected component.

7. The improved method of claim 2 in which each cell requires a minimum storage capacitance; the overlap areas of the cell electrode and of the dark matrix being sufficiently large and the part of the dielectric layer between them being sufficiently thin that the storage capacitor has at least the minimum storage capacitance.

8. The improved method of claim 2 in which the third patterned layer includes transparent conductive material.

9. The improved method of claim 8 in which the transparent conductive material is indium-tin-oxide.

10. The improved method of claim 2 in which overlap area of the cell electrode is along its edge.

11. The improved method of claim 10 in which the overlap area has a width of approximately 2 μm along the edge of the cell electrode.

12. The improved method of claim 10 in which the edge of the cell electrode forms a perimeter around the cell electrode; the overlap area extending along the entire perimeter around the cell electrode.

13. The improved method of claim 6 in which the overlap area of the cell electrode extends entirely around the perimeter at a substantially uniform width.

14. An improved method of forming an array of light active cells at a surface of a substrate; each cell including parts of a series of layers over the surface of the substrate; the series of layers including:

a first patterned layer; the first patterned layer including conductive material; the first patterned layer including scan lines;

a second patterned layer; the second patterned layer including conductive material; the second patterned layer including data lines;

a third patterned layer formed over said first and second patterned layers; the third patterned layer including conductive material; each cell including a cell electrode that is part of the third patterned layer;

a fourth patterned layer formed under said first and second patterned layers; the fourth patterned layer including dark matrix material that is conductive; each cell including a dark matrix that is part of the fourth patterned layer; and a layer of dielectric material between the third and fourth patterned layers;

the improvement comprising;

patterning the third patterned layer and the fourth patterned layer so that the cell electrode and the dark matrix of each cell overlap, the cell electrode and the dark matrix each having an overlap area where they overlap; the overlap area of the cell electrode, the overlap area of the dark matrix, and a part of the layer of dielectric material between them forming a storage capacitor for the cell; and electrically connecting the dark matrix of each cell to fixed potential circuitry to hold the dark matrix at a fixed potential.

15. The improved method of claim 14 in which the improvement further comprises depositing the layer of dielectric material to a thickness between 1000–2500 angstroms.

16. The improved method of claim 14 in which the dielectric material is silicon nitride.

17. The improved method of claim 14 in which the dielectric material is oxynitride or an oxide of silicon.

18. The improved method of claim 14 in which the fourth patterned layer forms a single connected component.

19. The improved method of claim 14 in which each cell requires a minimum storage capacitance; the overlap areas of the cell electrode and of the dark matrix being sufficiently large and the part of the dielectric layer between them being sufficiently thin that the storage capacitor has at least the minimum storage capacitance.

20. The improved method of claim 14 in which the third patterned layer includes transparent conductive material.

21. The improved method of claim 20 in which the transparent conductive material is indium-tin-oxide.

22. The improved method of claim 14 in which overlap area of the cell electrode is along its edge.

23. The improved method of claim 22 in which the overlap area has a width of approximately 2 μm along the edge of the cell electrode.

24. The improved method of claim 22 in which the edge of the cell electrode forms a perimeter around the cell electrode; the overlap area extending along the entire perimeter around the cell electrode.

25. The improved method of claim 27 in which the overlap area of the cell electrode extends entirely around the perimeter at a substantially uniform width.

26. An improved method of forming an array of light active cells at a surface of a substrate; each cell including parts of a series of layers over the surface of the substrate; the series of layers including:

a first patterned layer; the first patterned layer including conductive material; the first patterned layer including scan lines;

a second patterned layer; the second patterned layer including conductive material; the second patterned layer including data lines;

a third patterned layer; the third patterned layer including conductive material;

each cell including a cell electrode that is part of the third patterned layer;

a fourth patterned layer; the fourth patterned layer including dark matrix material that is conductive; the fourth patterned layer further including a patterned sublayer of light absorbent material; each cell including a dark matrix that is part of the fourth patterned layer; and a layer of dielectric material between the third and fourth patterned layers;

the improvement comprising;

patterning the third patterned layer and the fourth patterned layer so that the cell electrode and the dark matrix of each cell overlap, the cell electrode and the dark matrix each having an overlap area where they overlap; the overlap area of the cell electrode, the overlap area of the dark matrix, and a part of the layer of dielectric material between them forming a storage capacitor for the cell; and electrically connecting the dark matrix of each cell to fixed potential circuitry to hold the dark matrix at a fixed potential.

27. The improved method of claim 26 in which the improvement further comprises depositing the layer of dielectric material to a thickness between 1000–2500 angstroms.

28. The improved method of claim 26 in which the dielectric material is silicon nitride.

29. The improved method of claim 26 in which the dielectric material is oxynitride or an oxide of silicon.

30. The improved method of claim 26 in which the fourth patterned layer forms a single connected component.

31. The improved method of claim 26 in which each cell requires a minimum storage capacitance; the overlap areas of the cell electrode and of the dark matrix being sufficiently large and the part of the dielectric layer between them being sufficiently thin that the storage capacitor has at least the minimum storage capacitance.

32. The improved method of claim 26 in which the third patterned layer includes transparent conductive material.

33. The improved method of claim 32 in which the transparent conductive material is indium-tin-oxide.

34. The improved method of claim 26 in which overlap area of the cell electrode is along its edge.

35. The improved method of claim 34 in which the overlap area has a width of approximately 2 μm along the edge of the cell electrode.

36. The improved method of claim 34 in which the edge of the cell electrode forms a perimeter around the cell electrode; the overlap area extending along the entire perimeter around the cell electrode.

37. The improved method of claim 36 in which the overlap area of the cell electrode extends entirely around the perimeter at a substantially uniform width.

* * * * *